March 6, 1934.    H. A. TOULMIN, JR    1,949,698
LENS
Filed May 18, 1931    2 Sheets-Sheet 1

Inventor
HARRY A. TOULMIN, Jr.

March 6, 1934.   H. A. TOULMIN, JR   1,949,698
LENS
Filed May 18, 1931   2 Sheets-Sheet 2
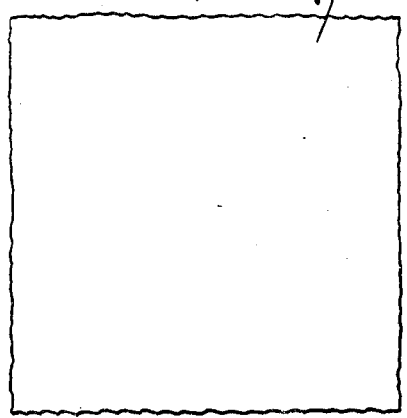
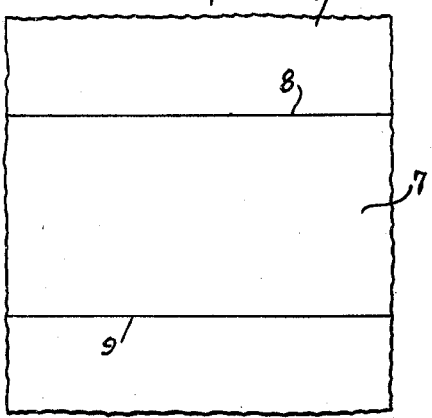
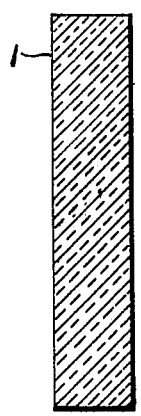
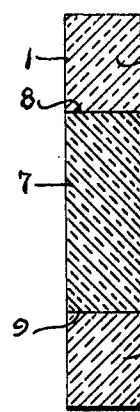
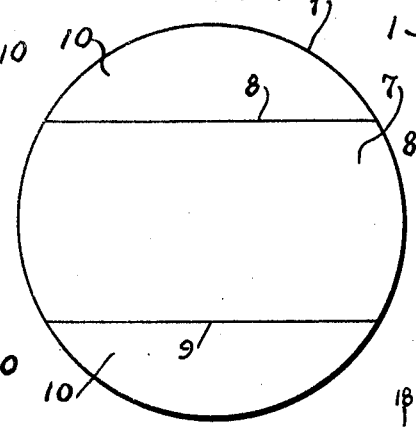
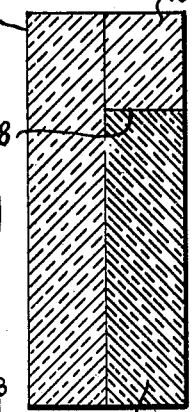
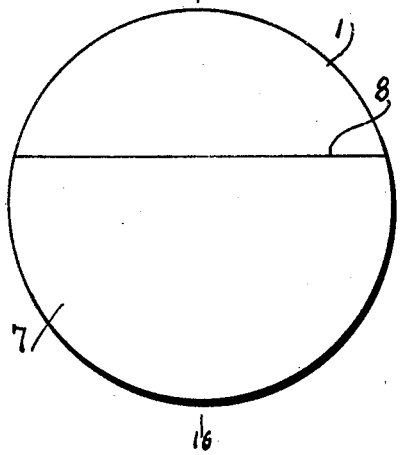
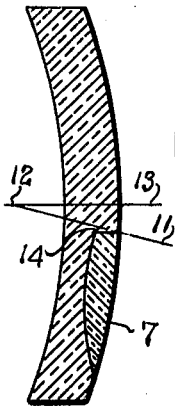
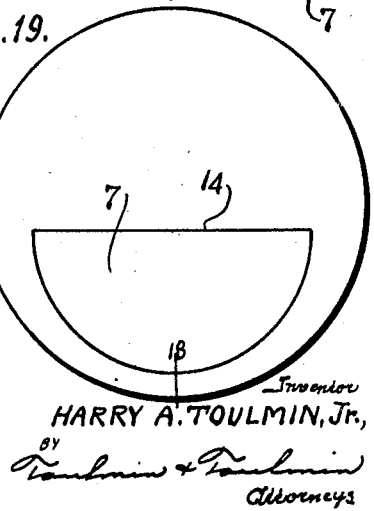
Inventor
HARRY A. TOULMIN, Jr.,
by Toulmin & Toulmin
Attorneys Patented Mar. 6, 1934

1,949,698

UNITED STATES PATENT OFFICE 1,949,698

LENS

Harry A. Toulmin, Jr., Dayton, Ohio, assignor to The Univis Corporation, Wilmington, Del., a corporation of Delaware Application May 18, 1931, Serial No. 538,066

6 Claims. (Cl. 88—54)

My invention relates to eyeglass lenses.

It is the object of my invention to provide a bifocal eyeglass lens, in which the reading segment can have its major vertical plane tilted to any desired angularity for the dual purpose of eliminating any prismatic effect when the vision of the wearer passes from the distance section to the near distance or reading section and for the second purpose of throwing the prism up or down in order to locate the optical center where it may be desired.

It is my object to provide a method of fusing an insert, preferably of composite character of flint and crown glass, in a crown glass support, such insert being uniform in section and in size so as to give uniformity of production, but which, according to the tilted position of the insert within the countersink of the major lens, will give the foregoing results.

It is an important object of my invention to provide means of so mounting a near vision insert that I can throw the optical center of the near vision insert at any position in its vertical height while still maintaining the original outline of the optical insert.

It is a further object to be able to use a relatively thin major lens with a relatively large and easily adjusted insert in which the insert has a back of the same glass as that of the major lens so that the deficiency in thickness of the major lens may be made up by the fusing thereto of the backing of the insert while, at the same time, permit of the use in the insert of such large size that it is easily adjusted and tilted in order to control the proper position of the insert for near distance vision.

Referring to the drawings:

Figure 11 is a plan view of a backing plate of raw glass;

Figure 12 is a front elevation of the first stage of manufacture of the insert before chipping and before the application of the backing plate;

Figure 13 is a section on the line 13—13 of Figure 11;

Figure 14 is a section on the line 14—14 of Figure 12;

Figure 15 is a front elevation of the chipped insert shown in Figure 12;

Figure 16 is a section on the line 16—16 of Figure 17;

Figure 17 is a front elevation of the insert button shown in Figure 19;

Figure 18 is a section on the line 18—18 of Figure 19;

Figure 19 is a front elevation of the completed lens with the insert fused therein from a button shown in Figure 17.

Figure 1:
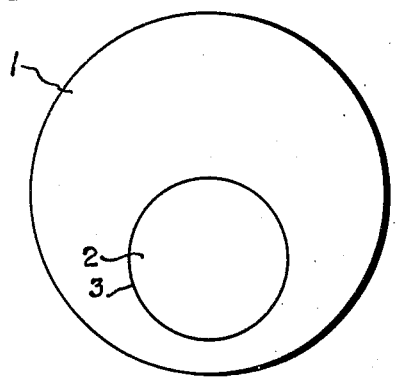
Figure 1 is a front elevation of the major lens with the countersink cut in the face thereof.
Figure 2:
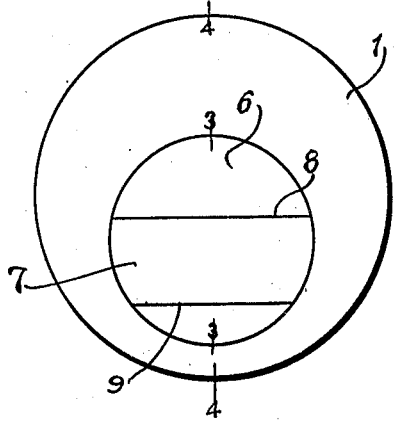
Figure 2 is a front elevation of the lens with the button in position prior to fusing.
Figure 3:
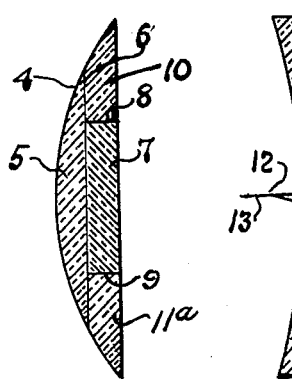
Figure 3 is a vertical section through the insert on the line 3—3 of Figure 2.

Referring to the drawings in detail, 1 is a major lens having a countersunk portion or spherically-curved depression 2 that is circular in outline as at 3. I mount in this spherically-curved depression a button comprising flint and crown glass, such button having a correspondingly spherically-curved face to that of the depression 2 in the main or major lens 1 which is also made of crown glass.

When I refer to "crown" and "flint" glass I comprehend within my invention any glass suitable for the purpose having different indices of refraction.

This spherically-curved face is designated 4. The button itself is composed of a plurality of pieces of glass which are thus made for convenience and then fused together as a composite button before insertion of the button in the countersink 2.

In the form shown in Figures 3, 4, 5, 6, 7 and 8, the insert comprises a back plate 5 having the spherically-curved back surface 4 and a flat front surface 6, such back plate being composed of crown glass. A rectangular block of flint glass 7 is fused thereto on the face 6 thereof. This rectangular block is preferably provided with grey edges at the top and bottom as at 8 and 9. Fused to these grey edges and to the exposed surfaces 6 of the block 5 are supplementary blocks of crown glass designated 10 and 11a whose outer faces are flush with the outer face of the block 7. This composite insert, when fused together, is mounted with its face within the face 2 of the countersink in the main lens 1 and rocked to the particular position as at Figures 4 and 5 which it is desired that the block 7 should ultimately occupy. In doing so it is preferable to provide the face 8 parallel to the line of vision 11 from the eye at 12 so that the line of vision of the eye, while looking downwardly from the horizontal line 13 below that line at distant objects, will not pass through any prismatic corner of the insert 7, and when the line of vision 11 lowers further, it will immediately pass without distortion and without delay into the segment 7 with full reading value and with full width of a reading area provided by the segment 7, as will be more fully seen in Figure 8.

Figures 4, 5:
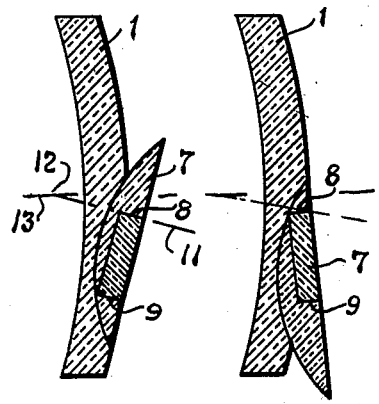
Figure 4 is a section on the line 4—4 of Figure 2 showing the position of the insert with the insert tilted to throw the prism down.
Figure 5 is a similar view with the insert tilted to throw the prism up.

If the insert is rocked as in Figure 5 instead of the line 11 passing parallel to the surface 8 of the insert 7, it will pass above the forward edge of the surface 8 of the insert 7 but with the same result, irrespective of the fact that the optical center has now been thrown upwardly instead of downwardly when the lens is ultimately ground.

Figure 8:
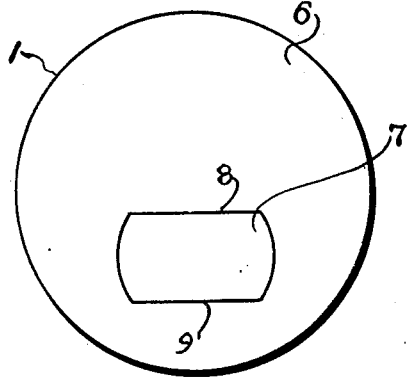
Figure 8 is a front elevation of the finished lens showing its appearance either in the form of Figure 6 or Figure 7 in which the form of the zonal insert is not changed by throwing the prism up or down, while, at the same time, secure that result and thereby controlling the optical center of the insert.
Figure 9:
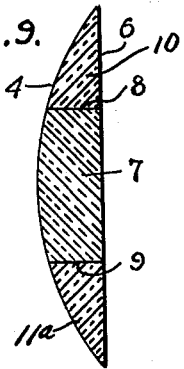
Figure 9 is a section through the insert comprising three blocks of glass, two of which are of crown glass and one of flint for the insert.

As a result of this arrangement of rocking the insert, it is possible not only to avoid very largely prismatic displacement at the edge of the insert, but the more important object is obtained of throwing the optical center of the insert where desired while, at the same time, not changing the form of the segmental insert as to its major outline. Thus, uniformity of appearance of the lenses is provided and uniformity of outline so that the wearer may become accustomed to a form of insert and not be disturbed by changes in that form due to changes in prescription. When an insert, such as shown in Figure 8, is utilized, this result is achieved from the invention in addition to the other advantages that flow from the important fact that, if desired, the segment may be so rocked that the line of vision through the optical center will be at substantially right angles to the vertical plane of the insert.

Figures 6, 7:
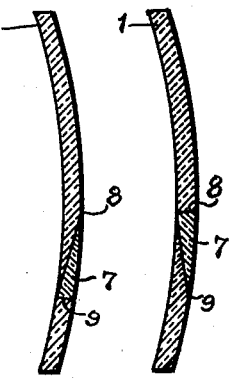
Figure 6 is a section through the finished lens showing the prism down.
Figure 7 is a similar view showing the prism up.

In the form shown in Figures 3, 4, 5, 6 and 7 where the major lens is to be extremely thin, the insert may extend approximately to the back of the lens or if it is desired to use a thicker lens and a thicker insert, then the form of insert shown in Figure 7 can be employed.

In making up this insert, I find it sometimes desirable to use a sheet of raw glass or crown glass, such as shown in Figure 11, then to assemble rectangular bars of crown and flint glass, as in Figure 12, and to fuse the two assemblies together as shown in Figures 13 and 14. I then grind the back of the composite insert to the proper curvature after having chipped the insert to its general circular form, as in Figure 15.

Figure 10:
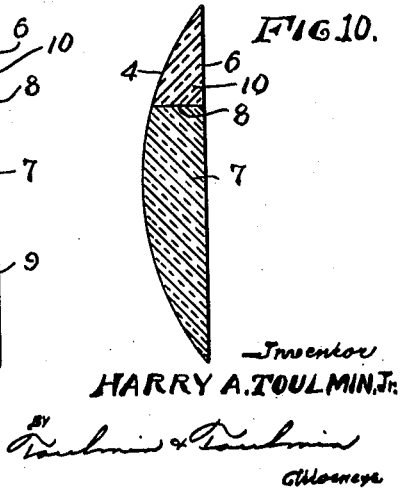
Figure 10 is a similar view showing the insert composed of two blocks of glass for the formation of the segmental insert shown in Figures 17, 18 and 19.

I follow the same procedure when making an insert such as shown in Figure 10 by first assembling the several parts of the insert in the rough form, as in Figure 16, after chipping to the general circular form as shown in Figure 17, and grinding the backing as in Figure 10, mounting in position in the main lens and fusing. I then have a lens as shown in Figure 18.

In this particular form of segment, the top 14 may be rocked up parallel with the line 11 as in Figure 4 or arranged as in Figure 18. By rocking the segment the optical center can be adjusted vertically.

It will be understood that I desire to comprehend within my invention such modifications as may be necessary to adapt it to varying conditions and uses.

Having thus fully described my invention, what I claim as new and desire to secure by Letters Patent, is:

1. In a method of manufacturing a lens, providing a major lens of one index of refraction having a spherical-curved countersink in the face thereof, securing therein a button of larger diameter than said countersink having an inserted portion of a different index of refraction imbedded in the front face thereof and extending partially therethrough, said button having a spherically-curved face engaging the countersink face, rocking said button to a predetermined desired position to adjust the position of the optical center in the resulting lens, fusing the button in the countersink of the first mentioned lens while in said rocked position, and grinding the resulting lens whereby the optical center is adjusted without changing the outline of the insert of the different index of refraction.

2. A new article of manufacture for use as an insert button in a bifocal lens comprising a rectangular block of flint glass, a block of crown glass behind said flint glass, and blocks of crown glass on either side of said flint glass, said blocks being fused together and the rear surfaces thereof being ground to the surface of the sphere.

3. A new article of manufacture for use as an insert button in a bifocal lens comprising a rectangular block of flint glass, a block of crown glass behind said flint glass, and blocks of crown glass on either side of said flint glass, said blocks being fused together and the rear surfaces thereof being ground to the surface of the sphere, the top and bottom edges of said flint block being greyed.

4. In a method of manufacturing a bifocal eyeglass lens, providing a block of flint glass, fusing blocks of crown glass on the top and bottom edges thereof, fusing a block of crown glass on the back of said three blocks of glass, imparting a surface constituting a part of a sphere to the back of said crown glass blocks, inserting the composite insert in a major lens of crown glass having a concave receiving surface, rocking the flat face of said insert with respect to the vertical plane of said major lens to adjust the position of the optical center of the flint glass insert, fusing the insert into the major lens, and grinding the lens.

5. In a method of manufacturing a bifocal eye glass lens, providing a major lens with a spherically-curved countersink, providing a button of a larger size than said countersink by forming a spherically-curved surface on one face of a crown glass plate and imbedding a flint glass insert in the opposite side of said plate, placing said button in said countersink with the spherically-curved surfaces thereof facing one another, moving said button relative to said countersink to place said flint glass insert in a predetermined angular position, and securing said button within said countersink while in said displaced arrangement.

6. In a method of manufacturing a bifocal eye glass lens, providing a major lens with a spherically-curved countersink, providing a button of a larger size than said countersink by forming a spherically-curved surface on one face of a crown glass plate and imbedding a flint glass insert in the opposite side of said plate, placing said button in said countersink with the spherically-curved surfaces thereof facing one another, moving said button relative to said countersink to place said flint glass insert in a predetermined angular position, securing said button within said countersink while in said displaced arrangement, and surfacing the exposed common surface of said button and said major portion to a uniform continuous curvature whereby the optical center of said insert is placed in a predetermined position.

HARRY A. TOULMIN, Jr.